Nov. 17, 1970 J. E. BELT ET AL 3,541,517

APPARATUS PROVIDING INTER-PROCESSOR COMMUNICATION AND PROGRAM CONTROL IN A MULTICOMPUTER SYSTEM

Filed May 19, 1966

INVENTORS
J.E. BELT
L.A. HITTEL
G.R. HOPE JR.
E.J. PORCELLI
L.L. RAKOCZI

BY

United States Patent Office 3,541,517

Patented Nov. 17, 1970

3,541,517
APPARATUS PROVIDING INTER-PROCESSOR COMMUNICATION AND PROGRAM CONTROL IN A MULTICOMPUTER SYSTEM

John Edward Belt and Lorenz A. Hittel, Phoenix, Ariz., George R. Hope, Jr., Largo, Fla., and Ernest J. Porcelli and Laszlo Leslie Rakoczi, Phoenix, Ariz., assignors to General Electric Company, a corporation of New York Filed May 19, 1966, Ser. No. 551,355
Int. Cl. G06f *9/18, 9/00*
U.S. Cl. 340—172.5 11 Claims

ABSTRACT OF THE DISCLOSURE

A multicomputer system is disclosed in which each of a plurality of processors is capable of executing, independently and simultaneously with other processors of the system, a computer program. In the execution of these programs certain contingencies may occur which require the execution of another or different program by another processor of the system. The processor encountering such a contingency, produces a communication set providing the information with respect to the contingency necessary to permit its resolution. The system's central controller upon receiving such a communication set stores it in the system data storage sub-system. The central controller then causes one of the data processors to execute the requested program. When such a requested program is assigned to a data processor, the central controller will not cause another data processor to execute the same program even if several processors are requesting that this same program be executed. When the assigned processor has completed the execution of the program, the central controller will cause the same processor to perform the same program as long as execution of the program is required.

This invention relates to multicomputer systems and more particularly to apparatus for exercising management control of a multicomputer system.

A multicomputer system comprises a plurality of data processors, a plurality of data storage units, and a plurality of input devices and output devices. The data processors process data by executing separate programs or program parts simultaneously. The data storage units store data to be processed, data which is the result of processing, and programs for controlling the processing operations of the data processors. The input devices supply programs and data to be processed and the output devices receive and utilize processed data. Communication must be provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs and data to be processed to the data storage units from the input devices and to transfer processed data from the data storage units to the output devices.

The apparatus of the instant invention provides a portion of the management control for such a multicomputer system. Generally, management control of the multicomputer system described comprises expeditiously supplying data to be processed and the programs providing the required data processing functions to the data processors, and efficiently controlling the output devices to receive and utilize the processed data. Such management control is effected by providing and controlling all required communications between the processors and data storage units; by providing for the assignment of programs to data processors for execution in accordance with the required urgencies for execution of the different programs, the availability of the required input and output devices, the availability of the required data storage space in the data storage units, and the relative capabilities of the data processors for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the processors, or when the processors become partially or totally inoperative; etc.

Each data processor of a multicomputer system executes a program separately from the programs being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring the transfer of a data item between a data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

Each input/output processor of a multicomputer system performs control and data transmission operations for its respective set of input and output devices separately from the operations being performed by the other input/output processors and separately from the programs being executed by the data processors. An input/output processor controls the storage of the data items provided by each of its associated input devices in a respective set of cells of the data storage system. Thus, in transmitting the data items supplied in succession by a particular input device an input/output processor supplies in sequence addresses of the cells of a cell set for receiving and storing the data items. Similarly, data items for transmission to each of its associated output devices are obtained by the input/output processor from a respective set of cells of the data storage system. Thus, in transmitting data items in succession to a particular output device an input/output processor also supplies in sequence addresses of the cells of the cell set storing the data items.

An input device is required to supply data to be processed when a program being executed by a data processor requires such data. An input device is required to supply a program for execution when the management control requires such program, following termination of execution of one or more of the programs presently in the data storage system. However, an input device may also voluntarily supply data and programs. An output device is required to receive data when a program being executed by a data processor has processed and made available in the data storage system a predetermined quantum of data.

When input or output devices in operation encounter certain conditions of operation or contingencies, corresponding programs or program parts must be executed by the data processors before these input or output devices can continue. Information relating to each condition or contingency detected by an input or output device must be communicated to the data processors through the corresponding input/output processor. The information to be communicated, termed a "communication set" herein, comprises an identification of the particular input or output device involved; a representation of the status of the device, the status indicating whether the device is terminating a respective input or output operation, whether an error condition has been countered which does not permit continuation of operation, whether an erroneous address has been supplied, or whether the device was busy when given an order to commence an input or output operation; a representation of certain errors detected during the input or output operation which do not force termination of the operation, such as certain data errors; etc.

To provide most efficient operation of the above-described multicomputer system it is desirable to provide control apparatus to enable the data processors to execute their respective programs simultaneously and independently of each other, and to enable the input-output processors to execute their respective control and data transmission operations simultaneously and independently of each other and substantially independently of the data processors. Accordingly, for most efficient operation of the multicomputer system, an input/output processor which requests a data processor to execute a particular program to resolve a condition or contingency in an input or output device, should not be required to halt following preparation and presentation of a communication set until the data processor is ready to accept the communication set. Instead, it is desirable to provide control apparatus for freeing an input/output processor to continue to perform its functions immediately following presentation of the communication set.

Additionally, to provide most efficient operation of the multicomputer system a data processor should be permitted to execute to an orderly point for suspension any program it is executing, instead of being required to suspend such program to accept a communication set immediately upon presentation of the set by an input/output processor. When a data processor is required immediately to suspend execution of its current program to accept a communication set, complex apparatus must be provided to so interrupt the program and subsequently to provide for resumption of the program from the point of interruption. Accordingly, it is desirable to provide additional control apparatus for implementing the multicomputer management control function of enabling transfer of a communication set between an input/output processor and a particular data processor without requiring the input/output processor to halt and without requiring immediate suspension of the program being executed by the related data processor.

In providing such control apparatus it is desirable to provide further for any one of the processors of the multicomputer system to be enabled to transmit information to any other processor of the system without requiring the transmitting processor to halt and without requiring the receiving processor to suspend immediately its current operation.

Therefore, it is an object of this invention to provide improved management control apparatus for increasing the effectiveness and the efficiency of operation of a multicomputer system.

Another object of this invention is to provide improved management control apparatus for increasing the effectiveness of communication between the processors of a multicomputer system.

Another object of this invention is to provide improved management control apparatus for increasing the effectiveness of communication between an input-output processor and a data processor in a multicomputer system.

Another object of this invention is to provide improved apparatus for enabling a first processor to communicate with a second processor in a multicomputer system, without the first processor being required to half or the second processor being required to suspend immediately its current operation.

To provide direct transmission of a communication set from an input/output processor to any one of the data processors and to provide direct reception of a communication set by a data processor from any one of the input/output processors, a complex and costly data transmission network would be required. Each input/output processor would require a separate data transmission link to transfer a communication set to each data processor and each data processor would require coupling to a data transmission link from each input/output processor in order to receive communication sets from all input/output processors. Furthermore, if provision is to be made for enabling direct communication between each processor of a multicomputer system and any other processor of the system the required data communication network would be even more complex and costly. Accordingly, it is desirable to provide apparatus for enabling transfer of information between any two processors of a multicomputer system without requiring the complex and costly data communication network necessary to provide direct transmission of information therebetween.

Therefore, an other object of this invention is to provide apparatus for effecting simple and inexpensive communication between the processors of a multicomputer system.

To execute a program requested by an input/output processor for one of its associated input or output devices by suspending the program it has been executing, a data processor must store the status of the suspended program in the data storage system, retrieve the initial portion of the requested program from the data storage system and initiate execution of this program, terminate the requested program upon its completion, and retrieve the stored status of the suspended program and initiate execution of the suspended program from the point of suspension. Thus, to suspend a program, to replace it in execution with another program, and to restore the suspended program to execution requires a substantial amount of time of the data processor involved. In a multicomputer system of the type described, a relatively huge number of input and output devices are simultaneously in operation. Within a relatively short period a number of these devices may encounter conditions of operation requiring execution of the same program by a data processor. For example, a number of input and output devices may terminate their respective input and output operations substantially simultaneously. To provide most efficient operation of the multicomputer system, it is desirable to reduce the time-wasting requirements for a data processor to suspend a program, replace it in execution with another requested program, and restore the suspended program to execution each time an input or output device requires the execution of a program by a data processor.

Therefore, another object of this invention is to provide apparatus for controlling the efficient execution of a plurality of similar programs by the data processors of a multicomputer system.

The foregoing objects are achieved, according to one embodiment of the instant invention, by providing a multi-computer system wherein a central controller effects indirect communication of information between the processors of the system by utilizing the data storage system as an element in the communication network and wherein the central controller effects the repeated execution of a particular program by one data processor so long as execution of the program is required. The central controller is coupled to communicate with all of the processors and the data storage system. A unique group of cells of the data storage system is assigned to each type of program which will be requested by the input/output processors, each cell group being adapted to store a plurality of communication sets.

An input/output processor, when ready to communicate with a data processor, supplies signals representing a communication set and a signal code set representing the program requested for execution. Upon receipt of the communication set from the input/output processor, the central controller transmits the communication set signals to the data storage system and initiates an operation of the storage system for storing the communication set in the cell group corresponding to the requested program. During this operation the central controller responds to the code set and transmits a stored prepared address to the storage system, the prepared address identifying particular cells in the aforementioned cell group wherein the communication set is stored. Following transmittal of the stored prepared address the central controller increments the value of the stored prepared address to identify adjacent cells in the cell group for storing the next-arriving communication set for the corresponding requested program.

The central controller also responds to the code set to store therein an indicium of the requested program. In response to this stored indicium the central controller notifies one of the data processors that the corresponding program requires execution. After the notified data processor reaches an orderly point to suspend the program it has been executing upon receipt of the notification, it stores the status of this program and initiates execution of the requested program. The data processor commences to execute the requested program by retrieving the corresponding communication set from the storage system and executes the requested program in accordance with the information represented by the communication set.

At the time the data processor commences execution of the requested program, the central controller removes therefrom the corresponding stored indicium. The central controller also inhibits further storage of this indicium so long as the data processor continues to execute the requested program. Accordingly, while the requested program is being executed, the corresponding indicium will not be stored in the central controller if an input/output processor supplies a code set representing a request for the same program. Instead, the central controller will supply only the prepared address for storing the communication set provided in the corresponding cell group. When the data processor completes execution of the requested program, it retrieves the next communication set from the corresponding cell group and repeats execution of the requested program. The requested program will be repeatedly executed by the same data processor so long as a communication set is stored in the corresponding cell group. In this manner the time-wasting requirements of program suspension, initiation, and resumption are reduced to a minimum, consistent with the effective operation of the system.

Certain portions of the apparatus herein disclosed are not of our invention, but are the inventions of:

S. F. Aranyi, J. P. Barlow, R. Barton, L. L. Rakoczi, and M. A. Torfeh, as defined by the claims of their application, Ser. No. 551,657, filed May 20, 1966; entitled: Multi-Word Storage Access Control Apparatus for a Data Processing System.

J. P. Barlow, C. R. Jones, and J. L. Kerr, as defined by the claims of their application, Ser. No. 559,305, filed June 21, 1966; entitled: Apparatus Providing a Unique Decision Signal for Concurrent Interrogation Signals.

W. W. Chu and N. R. Crain, as defined by the claims of their application, Ser. No. 559,497, filed June 22, 1966; entitled: Apparatus for Providing Controllable Delays.

S. F. Aranyi, J. P. Barlow, E. J. Porcelli, L. L. Rakoczi, and M. A. Torfeh, as defined by the claims of their application, Ser. No. 568,343, filed July 27, 1966; entitled: Interprocessing Multicomputer Systems.

J. E. Belt, L. A. Hittel, and L. L. Rakoczi, as defined by the claims of their application, Ser. No. 612,560, filed Jan. 30, 1967; entitled: Apparatus Providing Identification of Programs in a Multiprogrammed Data Processing System.

J. P. Barlow, R. Barton, L. L. Rakoczi, and M. A. Torfeh, as defined by the claims of their application, Ser. No. 618,076, filed Feb. 23, 1967; entitled: Data Storage Access Control Apparatus for a Multicomputer System.

J. P. Barlow, R. Barton, E. J. Porcelli, L. L. Rakoczi, and M. A. Torfeh, as defined by the claims of their application, Ser. No. 619,377, filed Feb. 28, 1967; entitled: Data Storage Access Control Apparatus for a Multicomputer System.

S. F. Aranyi, J. P. Barlow, L. L. Rakoczi, L. A. Hittel, and M. A. Torfeh, as defined by the claims of their application, Ser. No. 623,284, filed Mar. 15, 1967; entitled: Data Storage Access Control Apparatus for a Multicomputer System, and J. R. Hudson, L. L. Rakoczi, and D. L. Sansbury, as defined by the claims of their application, Ser. No. 646,504, filed on or about June 16, 1967; entitled: Program Interruption and Assignment Apparatus in a Multiprogrammed Data Processing System. All such applications being assigned to the assignee of the present application.

DESCRIPTION OF DRAWINGS

The invention will be described with reference to the accompanying drawings, wherein.

Figure 1:
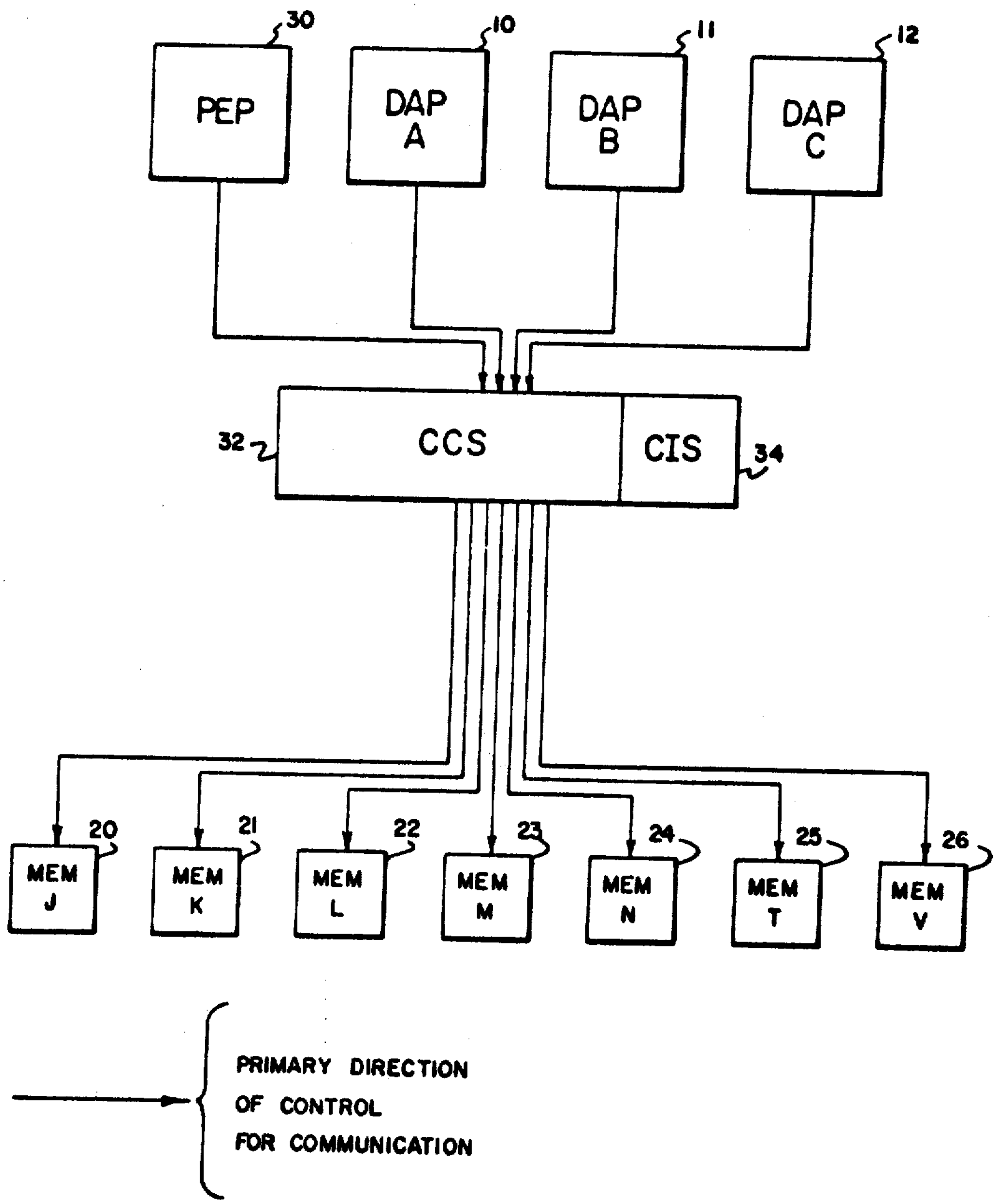
FIG. 1 is a block diagram of a Multicomputer Data Processing System to which the instant invention is applicable.

For a complete description of the system of FIG. 1 and of our invention, reference is made to U.S. Pat. No. 3,444,525 entitled "Centrally Controlled Multicomputer System" by Jesse P. Barlow, Richard Barton, John E. Belt, Carlton R. Fraiser, Lorenz A. Hittel, Laszlo L. Rakoczi, Mark A. Torfeh, and Jerome B. Wiener, and assigned to the assignee of the present invention. More particularly, attention is directed to FIGS. 2 through 110 of the drawings and to the specification beginning at column 8, line 4, and ending at column 173, line 9, inclusive of U.S. Pat. No.3,444,525, which are incorporated herein by reference and made a part hereof as if fully set forth herein.

What is claimed is:

1. For employment with a data processing system including a plurality of data processors, each of said data processors being adopted to receive data words, to execute a sequence of different processing operations on received data words in response to a corresponding sequence of instructions, and to generate data words representing the processed results of said operations; means for assigning a sequence of instructions to each of said processors and a request signalling means for providing request signal sets when predetermined contingencies occur in said system, each of said signal sets representing a respective sequence of processing operations required to be executed when a corresponding one of said contingencies occur, the combination comprising: a program request storage member for storing indicia of requests for the execution of different sequences of processing operations, said request storage member being coupled to said request signalling means to receive said signal sets and normally being responsive to said signal sets to store indicia corresponding to the respective operation sequences represented by the said signal sets; means responsive to each of said stored indicia for initiating operation of said data processors to execute the corresponding operation sequences; and means responsive to the execution of a particular one of said requested operation sequences by one of said data processors for disabling said request storage member from responding to the ones of said signal sets corresponding to said one operation sequence, whereby said request storage member is inhibited from storing an indicium of a requested operation sequence when one of said data processors is executing said requested sequence.

2. A data processing system comprising: at least one data processor, each of said data processors being adapted to receive data words, to execute a sequence of different processing operations on received data words in response to a corresponding sequence of instructions, and to generate data words representing the processed results of said operations; at least one input-output processor, each of said input-output processors being adapted to execute a sequence of operations for receiving and transmitting data words; means for assigning a sequence of processing operations to each of said processors, said processors providing request signal sets when predetermined contingencies are detected thereby, each of said signal sets representing a respective sequence of processing operations required to be executed when a corresponding one of said contingencies occur; a program request storage member for storing indicia of requests for the execution of different sequences of processing operations, said request storage member being coupled to said processors to receive said signal sets and normally being responsive to said signal sets to store indicia corresponding to the respective operation sequences represented by said signal sets; means responsive to each of said stored indicia for initiating operation of said data processors to execute the corresponding operation sequences; and means responsive to the execution of a particular one of said requested operation sequences by one of said data processors for disabling said request storage member from responding to the ones of said signal sets corresponding to said one operation sequence, whereby said request storage member is inhibited from storing an indicium of a requested operation sequence when one of said data processors is executing said requested sequence.

3. The data processing system of claim 2, wherein said processors providing said request signal sets are said input-output processors.

4. A data processing system comprising: at least one data processor, each of said data processors being adapted to receive data words, to execute a sequence of different processing operations on received data words in response to a corresponding sequence of instructions, and to generate data words representing the processed results of said operations; at least one input-output processor, each of said input-output processors being adapted to execute a sequence of operations for receiving and transmitting data words; means for assigning a sequence of processing operations to each processor, said processors providing request signal sets when predetermined contingencies are detected thereby, each of said signal sets representing a respective sequence of processing operations required to be executed when a corresponding one of said contingencies occur; a program request storage member for storing indicia of requests for the execution of different sequences of processing operations, said request storage member being coupled to said processors to receive said signal sets and normally being responsive to said signal sets to store indicia corresponding to the respective operation sequences represented by said signal sets; means responsive to each of said stored indicia for initiating operations of said data processors to execute the corresponding operation sequences; means responsive to the initiation of execution of each of said requested operation sequences by said data processors for removing the corresponding indicium from storage in said request storage member; and means responsive to the execution of a particular one of said requested operation sequences by one of said data processors for disabling said request storage member from responding to the ones of said signal sets corresponding to said one operation sequence, whereby said request storage member is inhibited from storing an indicium of a requested operation sequence when one of said data processors is executing said requested sequence.

5. For employment with a data processing system including a plurality of data processors, each of said data processors being adapted to receive data words, to execute a sequence of different processing operations on received data words in response to a corresponding sequence of instructions, and to generate data words representing the processed results of said operations; means for assigning a sequence of processing operations to each of said processors for execution and a request signalling means for providing request signal sets when predetermined contingencies occur in said system, each of said signal sets representing a respective sequence of processing operations required to be executed when a corresponding one of said contingencies occur, the combination comprising: a program request storage member for storing indicia of requests for the execution of different sequences of processing operations, said request storage member being coupled to said request signalling means to receive said signal sets and normally being responsive to said signal sets to store indicia corresponding to the respective operation sequences represented by said signal sets; means responsive to each of said stored indicia for initiating operation of said data processors to execute the corresponding operation sequences; means responsive to the execution of a particular one of said requested operation sequences by one of said data processors for disabling said request storage member from responding to the ones of said signal sets corresponding to said one operation sequence; and means enabled during the execution of said one operation sequence by said one data processor and responsive to the receipt of another one of said signal sets requesting said one operation sequence for controlling said one data processor to repeat the execution of said one operation sequence.

6. For employment with a data processing system including a plurality of data processors, each of said data processors being adapted to receive data words, to execute a sequence of different processing operations on received data words in response to a corresponding sequence of instructions, and to generate data words representing the processed results of said operations; and a request signalling means for providing request signal sets when predetermined contingencies occur in said system and for providing data words characteristic of said contingencies, each of said signal sets representing a respective sequence of processing operations required to be executed when a corresponding one of said contingencies occur, the combination comprising: a data storage member adapted to store a data word in each one of a plurality of addressable storage cells; address generating means coupled to receive said signal sets and responsive to a particular kind of said signal sets for providing an address of one of said cells, the address provided by said address generating means being modified by a predetermined amount each time said particular kind of signal set is received by said address generating means; means responsive to each of said addresses for storing the corresponding characteristic data word in the one of said cells corresponding to said address; processor initiating means responsive to the receipt of a first one of said particular kind of signal set by said address generating means for initiating operation of one of said data processors to execute a particular sequence of processing operations in accordance with the corresponding characteristic data word supplied; and means further controlling said one data processor to repeatedly execute said particular sequence so long as at least one of said characteristic data words continues to be stored in said data storage member.

7. A data processing system comprising: at least one data processor, each of said data processors being adapted to receive data words, to execute a sequence of different processing operations on received data words in response to a corresponding sequence of instructions, and to generate data words representing the processed results of said operations; at least one input-output processor, each of said input-output processors being adapted to execute a sequence of operations for receiving and transmitting data words; said processors providing request signal sets when predetermined contingencies are detected thereby and providing data words characteristic of said contingencies, each of said signal sets representing a respective sequence of processing operations required to be executed when a corresponding one of said contingencies occur; a data storage member adapted to store a data word in each one of a plurality of addressable storage cells; address generating means coupled to receive said signal sets and responsive to a particular kind of said signal sets for providing an address of one of said cells, the address provided by said address generating means being modified by a predetermined amount each time said particular kind of signal set is received by said address generating means; means responsive to each of said addresses for storing the corresponding characteristic data word in the one of said cells corresponding to said address; processor initiating means responsive to the receipt of a first one of said particular kind of signal set by said address generating means for initiating operation of one of said data processors to execute a particular sequence of processing operations in accordance with the corresponding characteristic data word supplied; and means further controlling said one data processor to repeatedly execute said particular sequence so long as at least one of said characteristic data words continues to be stored in said data storage member.

8. The data processing system of claim 7, wherein said processors providing said request signal sets and characteristic data words are said input-output processors.

9. For employment with a data processing system including a plurality of data processors, each of said data processors being adapted to receive data words, to execute a sequence of different processing operations on received data words in response to a corresponding sequence of instructions, and to generate data words representing the processed results of said operations; a data storage member adapted to store a data word in each one of a plurality of addressable storage cells; and a request signalling means for providing request signal sets when predetermined contingencies occur in said system and for providing data words characteristic of said contingencies, each of said signal sets representing a respective sequence of processing operations required to be executed when a corresponding one of said contingencies occur, the combination comprising: a program request storage member for storing indicia of requests for the execution of different sequences of processing operations, said request storage member being coupled to said request signalling means to receive said signal sets and normally being responsive to said signal sets to store indicia corresponding to the respective operation sequences represented by said signal sets; address generating means coupled to receive said signal sets and responsive to a particular kind of said signal sets for providing an address of one of said cells, the address provided by said address generating means being modified by a predetermined amount each time said particular kind of signal set is received thereby; means responsive to each of said addresses for storing the corresponding characteristic data word in the one of said cells corresponding to said address; processor initiating means responsive to each of said stored indicia for initiating operation of said data processors to execute the corresponding operation sequences, said processor initiating means responding to the one of said stored indicia corresponding to said particular kind of signal set for initiating operation of one of said data processors to execute a particular sequence of processing operations in accordance with the corresponding characteristic data word supplied; means responsive to the execution of said particular processing operation sequence by one of said data processors for disabling said request storage member from responding to the one of said signal sets corresponding to said particular operation sequence; and means further controlling said one data processor to repeatedly execute said particular sequence so long as at least one of said characteristic data words continues to be stored in said data storage member.

10. A data processing system comprising: at least one data processor, each of said data processors being adapted to receive data words, to execute a sequence of different processing operations on received data words in response to a corresponding sequence of instructions, and to generate data words representing the processed results of said operations; at least one input-output processor, each of said input-output processors being adapted to execute a sequence of operations for receiving and transmitting data words; a data storage member adapted to store a data word in each one of a plurality of addressable storage cells; said processors providing request signal sets when predetermined contingencies are detected thereby and providing data words characteristic of said contingencies, each of said signal sets representing a respective sequence of processing operations required to be executed when a corresponding one of said contingencies occur, the combination comprising: a program request storage member for storing indicia of requests for the execution of different sequences of processing operations, said request storage member being coupled to said processors to receive said signal sets and normally being responsive to said signal sets to store indicia corresponding to the respective operation sequences represented by said signal sets; address generating means coupled to receive said signal sets and responsive to a particular kind of said signal sets for providing an address of one of said cells, the address provided by said address generating means being modified by a predetermined amount each time said particular kind of signal set is received thereby; means responsive to each of said addresses for storing the corresponding characteristic data word in the one of said cells corresponding to said address; processor initiating means responsive to each of said stored indicia for initiating operation of said data processors to execute the corresponding operation sequences, said processor initiating means responding to the one of said stored indicia corresponding to said particular kind of signal set for initiating operation of one of said data processors to execute a particular sequence of processing operations in accordance with the corresponding characteristic data word supplied; means responsive to the execution of said particular processing operation sequence by one of said data processors for disabling said request storage member from responding to the one of said signal sets corresponding to said particular operation sequence; and means further controlling said one data processor to repeatedly execute said particular sequence so long as at least one of said characteristic data words continues to be stored in said data storage member.

11. A data processing system comprising: at least one data processor, each of said data processors being adapted to receive data words, to execute a sequence of different processing operations on received data words in response to a corresponding sequence of instructions, and to generate data words representing the processed results of said operations; at least one input-output processor, each of said input-output processors being adapted to execute a sequence of operations for receiving and transmitting data words; a data storage member adapted to store a data word in each one of a plurality of addressable storage cells; said processors providing request signal sets when predetermined contingencies are detected thereby and providing data words characteristic of said contingencies, each of said signal sets representing a respective sequence of processing operations required to be executed when a corresponding one of said contingencies occur, the combination comprising: a program request storage member for storing indicia of requests for the execution of different sequences of processing operations, said request storage member being coupled to said processors to receive said signal sets and normally being responsive to said signal sets to store indicia corresponding to the respective operation sequences represented by said signal sets; address generating means coupled to receive said signal sets and responsive to a particular kind of said signal sets for providing an address of one of said cells, the address provided by said address generating means being modified by a predetermined amount each time said particular kind of signal set is received thereby; means responsive to each of said addresses for storing the corresponding characteristic data word in the one of said cells corresponding to said address; processor initiating means responsive to each of said stored indicia for initiating operation of said data processors to execute the corresponding operation sequences, said processor initiating means responding to the one of said stored indicia corresponding to said particular kind of signal set for initiating operation of one of said data processors to execute a particular sequence of processing operations in accordance with the corresponding characteristic data word supplied; means responsive to the initiation of execution of each of said requested operation sequences by said data processors for removing the corresponding indicium from storage in said request storage member; means responsive to the execution of said particular processing operation sequence by one of said data processors for disabling said request storage member from responding to the one of said signal sets corresponding to said particular operation sequence; and means further controlling said one data processor to repeatedly execute said particular sequence so long as at least one of said characteristic data words continues to be stored in said data storage member.

References Cited

UNITED STATES PATENTS

| | | | |
|---|---|---|---|
| 3,323,109 | 5/1967 | Hecht et al. | 340—172.5 |
| 3,319,226 | 5/1967 | Mott | 340—172.5 |
| 3,312,953 | 4/1967 | Wang et al. | 340—172.5 |
| 3,312,951 | 4/1967 | Hertz | 340—172.5 |
| 3,312,943 | 4/1967 | McKindles et al. | 340—172.5 |
| 3,302,182 | 1/1967 | Lynch et al. | 340—172.5 |
| 3,274,561 | 9/1966 | Hallman et al. | 340—172.5 |
| 3,274,554 | 9/1966 | Hopper et al. | 340—172.5 |
| 3,242,467 | 3/1966 | Lamy | 340—172.5 |
| 3,229,260 | 1/1966 | Falkoff | 340—172.5 |
| 3,200,380 | 8/1965 | MacDonald et al. | 340—172.5 |

GARETH D. SHAW, Primary Examiner